(12) United States Patent
Lee et al.

(10) Patent No.: US 12,050,530 B1
(45) Date of Patent: Jul. 30, 2024

(54) METHOD AND APPARATUS FOR PERFORMING TABLE MANAGEMENT OF MEMORY DEVICE IN PREDETERMINED COMMUNICATIONS ARCHITECTURE WITH AID OF SYSTEM-REGION GARBAGE COLLECTION

(71) Applicant: Silicon Motion, Inc., Hsinchu County (TW)

(72) Inventors: Jie-Hao Lee, Hsinchu County (TW); Chen-Yin Lin, Taipei (TW); Chih-Wei Hsiao, Miaoli County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/125,123

(22) Filed: Mar. 23, 2023

(51) Int. Cl.
*G06F 12/02* (2006.01)

(52) U.S. Cl.
CPC ...... *G06F 12/0253* (2013.01); *G06F 12/0246* (2013.01)

(58) Field of Classification Search
None
See application file for complete search history.

(56) References Cited

U.S. PATENT DOCUMENTS

| 2013/0055012 | A1* | 2/2013 | Roh | G06F 11/108 714/6.22 |
| 2014/0380092 | A1* | 12/2014 | Kim | G06F 3/0659 714/6.24 |
| 2019/0050289 | A1 | 2/2019 | Kachare | |

OTHER PUBLICATIONS

Lee, the specification, including the claims, and drawings in the U.S. Appl. No. 18/125,131, filed Mar. 23, 2023.
Lee, the specification, including the claims, and drawings in the U.S. Appl. No. 18/125,138, filed Mar. 23, 2023.

* cited by examiner

*Primary Examiner* — Brian R Peugh
(74) *Attorney, Agent, or Firm* — Winston Hsu

(57) ABSTRACT

A method for performing table management of a memory device in predetermined communications architecture with aid of system-region garbage collection (GC) and associated apparatus are provided. The method may include: utilizing the memory controller to perform a system-region GC procedure to manage at least one table regarding internal management of the memory device. The system-region GC procedure may include: reading a set of first table contents from a set of first table pages; and writing the set of first table contents into a set of first system-region-GC-processed table pages of the at least one table block, and writing a first RAID parity of the set of first table contents into a first parity page corresponding to the set of first system-region-GC-processed table pages in the at least one table block, in order to generate a first system-region-GC-processed table RAID protection group, for protecting the set of first system-region-GC-processed table pages.

13 Claims, 10 Drawing Sheets

METHOD AND APPARATUS FOR PERFORMING TABLE MANAGEMENT OF MEMORY DEVICE IN PREDETERMINED COMMUNICATIONS ARCHITECTURE WITH AID OF SYSTEM-REGION GARBAGE COLLECTION

BACKGROUND OF THE INVENTION

1. Field of the Invention

The present invention is related to memory control, and more particularly, to a method and apparatus for performing table management of a memory device in a predetermined communications architecture with aid of system-region garbage collection (GC).

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As some files may be frequently accessed, some data may become invalid data, and it may be needed to release more storage space for further use. During accessing of the files, a portion of internal management information among multiple types of internal management information may change correspondingly. As the multiple types of internal management information may change in different manners, the management thereof is also complicated, causing the processing time of the associated processing to be increased. When power failure occurs, more processing is needed to prevent errors, causing the processing time to be further increased. It seems that there is no proper suggestion in the related art. Thus, a novel method and associated architecture are needed for solving the problems without introducing any side effect or in a way that is less likely to introduce a side effect.

SUMMARY OF THE INVENTION

It is an objective of the present invention to provide a method and apparatus for performing table management of a memory device in a predetermined communications architecture (e.g., a UFS communications architecture) with aid of system-region GC, in order to solve the above-mentioned problems.

It is another objective of the present invention to provide a method and apparatus for performing table management of a memory device in a predetermined communications architecture (e.g., a UFS communications architecture) with aid of system-region GC, in order to properly protect heterogeneous tables with table redundant array of independent disks (RAID) protection mechanism.

At least one embodiment of the present invention provides a method for performing table management of a memory device in a predetermined communications architecture with aid of system-region GC, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to perform a system-region GC procedure to manage at least one table regarding internal management of the memory device, wherein the at least one table is stored in at least one table block among the plurality of blocks and is stored with redundant array of independent disks (RAID) protection in the at least one table block. For example, the system-region GC procedure may comprise: reading a set of first table contents from a set of first table pages protected by a set of first existing table RAID protection groups, wherein any existing table RAID protection group among the set of first existing table RAID protection groups comprises at least one table page and a parity page, and at least two first existing table RAID protection groups among the set of first existing table RAID protection groups correspond to different parity ratios; and writing the set of first table contents into a set of first system-region-GC-processed table pages of the at least one table block, and writing a first RAID parity of the set of first table contents into a first parity page corresponding to the set of first system-region-GC-processed table pages in the at least one table block, in order to generate a first system-region-GC-processed table RAID protection group, for protecting the set of first system-region-GC-processed table pages, wherein a first parity ratio of the first system-region-GC-processed table RAID protection group is less than a parity ratio of an existing table RAID protection group among the at least two first existing table RAID protection groups.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform table management of the memory device in a predetermined communications architecture with aid of system-region GC. For example, the memory controller may perform a system-region GC procedure to manage at least one table regarding internal management of the memory device, wherein the at least one table is stored in at least one table block among the plurality of blocks and is stored with RAID protection in the at least one table block, and the system-region GC procedure may comprise: reading a set of first table contents from a set of first table pages protected by a set of first existing table RAID protection groups, wherein any existing table RAID protection group among the set of first existing table RAID protection groups comprises at least one table page and a parity page, and at least two first existing table RAID protection groups among the set of first existing table RAID protection groups correspond to different parity ratios; and writing the set of first table contents into a set of first system-region-GC-processed table pages of the at least one table block, and writing a first RAID parity of the set of first table contents into a first parity page corresponding to the set of first system-region-GC-processed table pages in the at least one table block, in order to generate a first system-region-GC-processed table RAID protection group, for protecting the set of first system-region-GC-processed table pages, wherein a first parity ratio of the first system-region-GC-processed table RAID protection group is less than a parity ratio of an existing table RAID protection group among the at least two first existing table RAID protection groups.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, determine a first updated table page count of at least one first updated table page protected by a parity page at a first time point, and write the corresponding RAID parity into the parity page to immediately start protecting the at least one first updated table page at this moment, rather than waiting for a non-protected table page count of non-protected table pages (e.g., table pages that have not been protected with any parity page) reaching a predetermined non-protected table page count threshold.

The present invention method and apparatus can guarantee that the memory device can operate properly in various situations. For example, when no further table update of the first table is needed at the first time point, the memory device (or the memory controller therein) may write the RAID parity into the parity page to immediately start protecting the at least one first updated table page at this moment, to reduce the processing load of sudden power off recovery (SPOR), and therefore enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
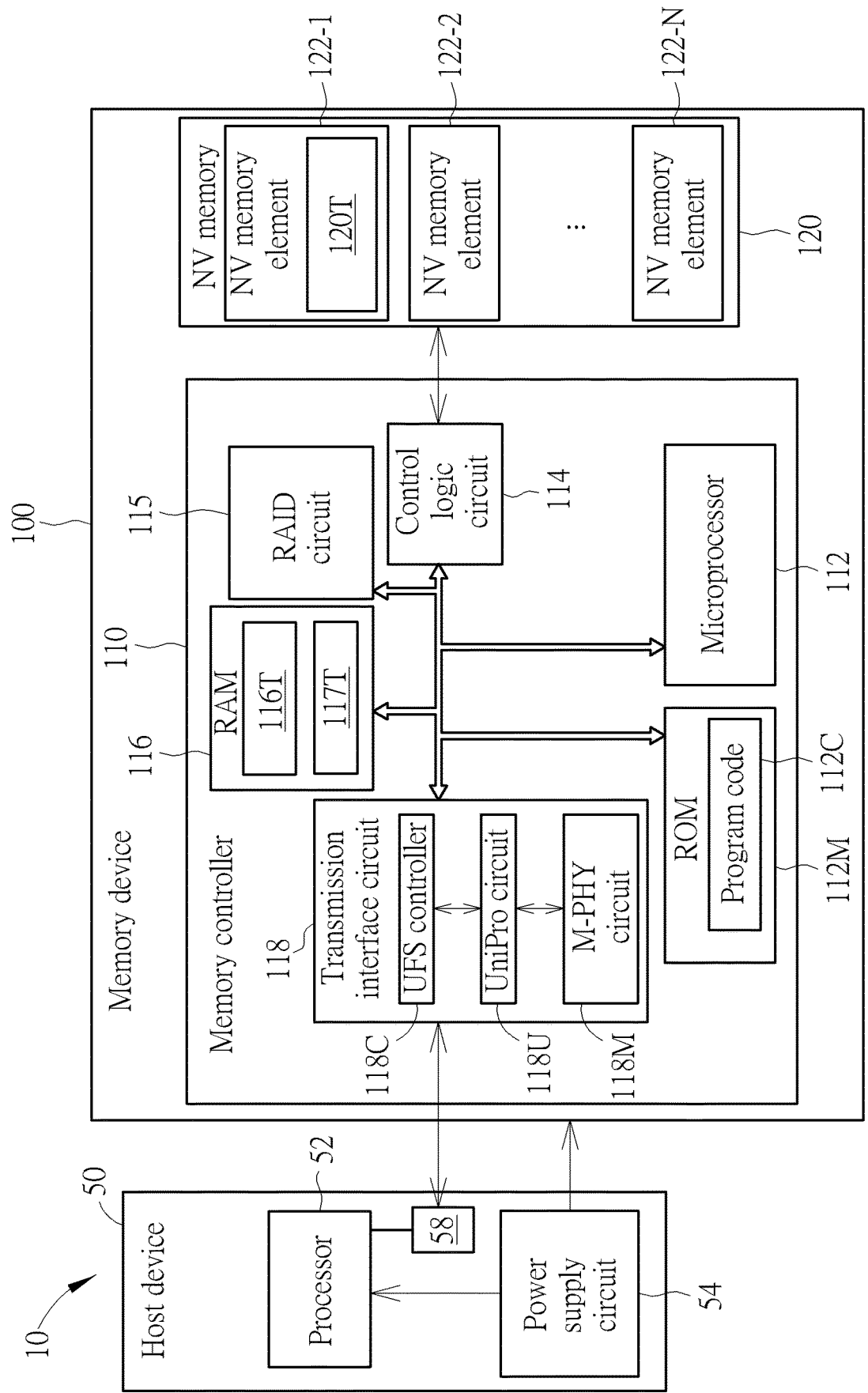
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAID circuit 115, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The RAID circuit 115 may perform RAID encoding and RAID decoding, in order to protect data and/or perform error correction for a physical page group, but the present invention is not limited thereto. According to some embodiments, the memory controller 110 may further comprise an error correction code (ECC) circuit (not shown), and utilize the ECC circuit to perform ECC encoding and ECC decoding, in order to protect data and/or perform error correction for any sub-storage-unit of multiple sub-storage-units within a physical page. For example, the multiple sub-storage-units may have a same size, such as a predetermined size smaller than that of the physical page.

The transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table such as a temporary P2L address mapping table 117T. For example, when there is a need, the memory controller 110 may refer to the temporary P2L address mapping table 117T to perform some internal management operations such as GC operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the plurality of local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

The memory region of the RAM 116 may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the memory region may be regarded as a data buffer. For example, the sub-region for temporarily storing the buffered data may be regarded as the data buffer, but the present invention is not limited thereto. According to some embodiments, the whole of the memory region, such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-*n* (where "n" may represent any integer in the interval [1, N]) within the NV memory elements 122-1, 122-2, . . . , and 122-N may comprise multiple blocks, and a block among the multiple blocks may comprise and record a specific number of pages, where the memory controller 110 may access a certain page of a certain block among the multiple blocks according to a block address and a page address.

According to some embodiments, the memory controller 110 may monitor valid page counts of at least one portion (e.g., a portion or all) of the plurality of blocks, respectively, for subsequent processing such as the GC operations. Regarding data reception, the memory controller 110 may configure at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block, where the temporary P2L address mapping table 117T may correspond to the first active block, and more particularly, store the associated mapping information for indicating P2L address mapping relationships regarding the first active block. In addition, the memory controller 110 may maintain (e.g., generate or update) the temporary P2L address mapping table 117T, in order to perform the associated internal management.

Figure 2:
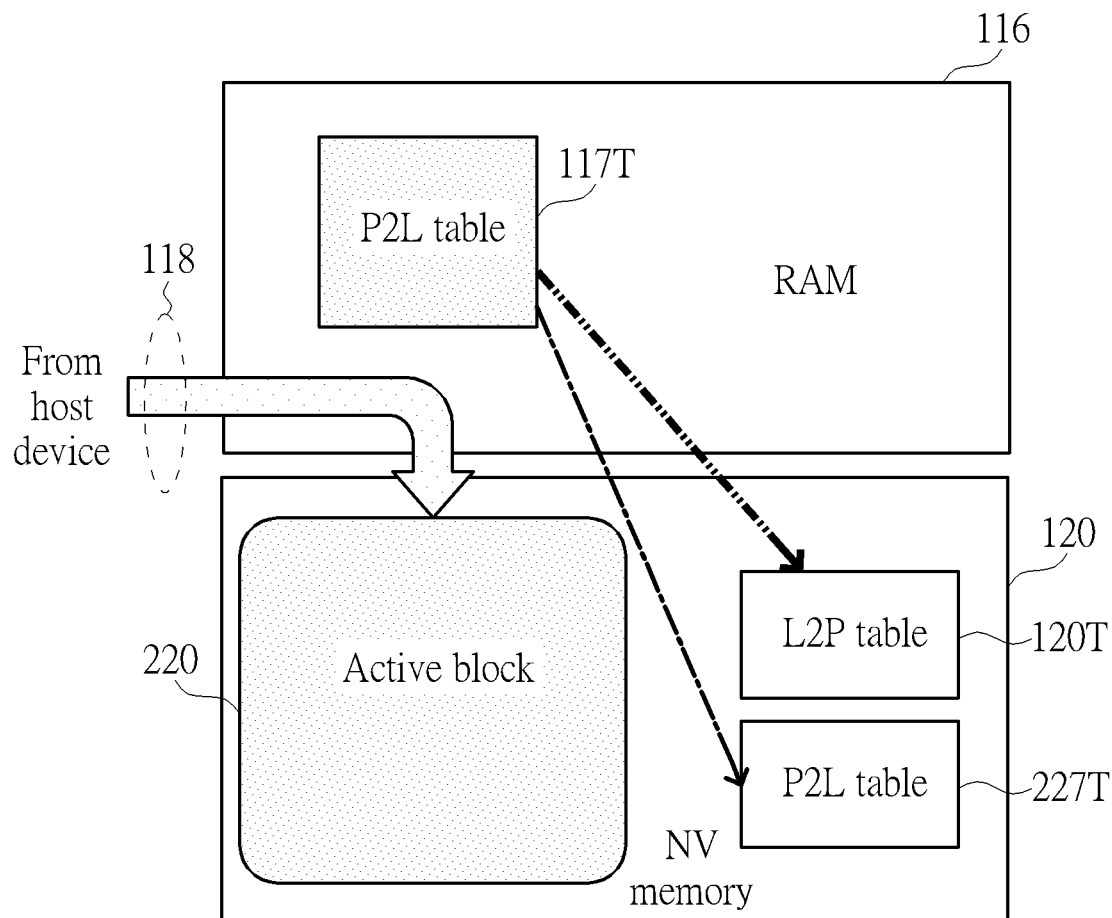
FIG. 2 illustrates a table processing control scheme according to an embodiment of the present invention.

FIG. 2 illustrates a table processing control scheme according to an embodiment of the present invention. During receiving and storing the data such as the host-write data (e.g., the data to be written into the NV memory 120) from the host device 50, the memory controller 110 may utilize the first active block such as an active block 220 to receive and store one or more sets of partial data among the plurality of sets of partial data, and record the associated mapping information such as P2L table entries into the temporary P2L address mapping table 117T (labeled "P2L table" for brevity) corresponding to the active block 220, for indicating the P2L address mapping relationships regarding the active block 220. The P2L address mapping relationships indicated by the P2L table entries may comprise the P2L address mapping relationships between the logical addresses at which the one or more sets of partial data are written by the host device 50 and the physical addresses indicating the locations where the one or more sets of partial data are stored in the active block 220. When a first predetermined criterion (e.g., the active block 220 is fully programmed) is met, the memory controller 110 may perform a set of table processing operations, and the set of table processing operations may comprise:

(1) a first table processing operation: updating the global L2P address mapping table 120T (labeled "L2P table" for brevity) according to the temporary P2L address mapping table 117T (labeled "P2L table" for brevity) corresponding to the active block 220, and more particularly, updating some L2P table entries (labeled "L2P entries" for brevity) in the global L2P address mapping table 120T according to the P2L table entries (labeled "P2L entries" for brevity) in the temporary P2L address mapping table 117T, for indicating L2P address mapping relationships regarding the active block 220;

(2) a second table processing operation: storing the temporary P2L address mapping table 117T (e.g., the P2L table entries therein) into the NV memory 120 to generate or update a first P2L address mapping table such as a P2L address mapping table 227T (labeled "P2L table" for brevity), for example, by writing all P2L table entries recorded in the temporary P2L address mapping table 117T into the P2L address mapping table 227T, for performing the subsequent processing mentioned above, where the P2L address mapping table 227T may be regarded as a backup version of the temporary P2L address mapping table 117T; and (3) a third table processing operation: after performing the first table processing operation (e.g., updating the global L2P address mapping table 120T according to the temporary P2L address mapping table 117T) and the second table processing operation (e.g., storing the temporary P2L address mapping table 117T into the NV memory 120), clearing the temporary P2L address mapping table 117T (e.g., the P2L table entries therein), for reusing the temporary P2L address mapping table 117T and/or the corresponding storage space in the RAM 116;

but the present invention is not limited thereto. According to some embodiments, the first table processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships among the L2P address mapping relationships regarding the active block 220, and updating the global L2P address mapping table 120T (e.g., this local L2P address mapping table therein) according to the temporary L2P address mapping table 116T.

After any active block (e.g., the active block 220) among the aforementioned at least one active block is fully programmed, the memory device 100 (e.g., the memory controller 110) may close the aforementioned any active block to make the aforementioned any active block become an inactive block, and select a blank block (e.g., an erased block) to be a replacement of the aforementioned any active block, for performing subsequent data reception corresponding to the aforementioned any active block. In addition, the subsequent processing mentioned above may comprise performing a GC procedure to write valid data among all data in the inactive block into another blank block (e.g., another erased block), but the present invention is not limited thereto.

According to some embodiments, as the P2L address mapping relationships indicated by the P2L table entries in the aforementioned at least one P2L address mapping table (e.g., the temporary P2L address mapping table 117T or the P2L address mapping table 227T) and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table. In addition, the memory controller 110 may perform a table management procedure to manage at least one table regarding internal management of the memory device 100, and the aforementioned at least one table may be stored in at least one table block among the plurality of blocks. For example, the aforementioned at least one table may comprise at least one address mapping table. The memory controller 110 may receive a set of first commands from the host device 50 through the transmission interface circuit 118, and perform the table management procedure to update the aforementioned at least one address mapping table correspondingly, where the set of first commands may indicate that writing a set of first data is requested, respectively. As updating some previous table contents of the aforementioned at least one table in response to some internal operations of the memory device 100 may be required, the memory controller 110 may write the updated table contents into one or more new table pages of the aforementioned at least one table block and mark one or more previous table pages storing the previous table contents as invalid page(s). The one or more new table pages may be one or more subsequent table pages in the aforementioned at least one table. For example, the one or more subsequent table pages may be blank page(s) coming after the one or more previous table pages. As the one or more new table pages may be arranged to store the updated table contents, the one or more new table pages may be referred to as the updated table page(s).

According to some embodiments, the aforementioned at least one table may be stored in a plurality of physical pages in the aforementioned at least one table block, and more particularly, may be protected in at least one table RAID protection group comprising at least one portion (e.g., a portion or all) of the plurality of physical pages, where any table RAID protection group among the aforementioned at least one table RAID protection group may be taken as an example of the physical page group.

Figure 3:
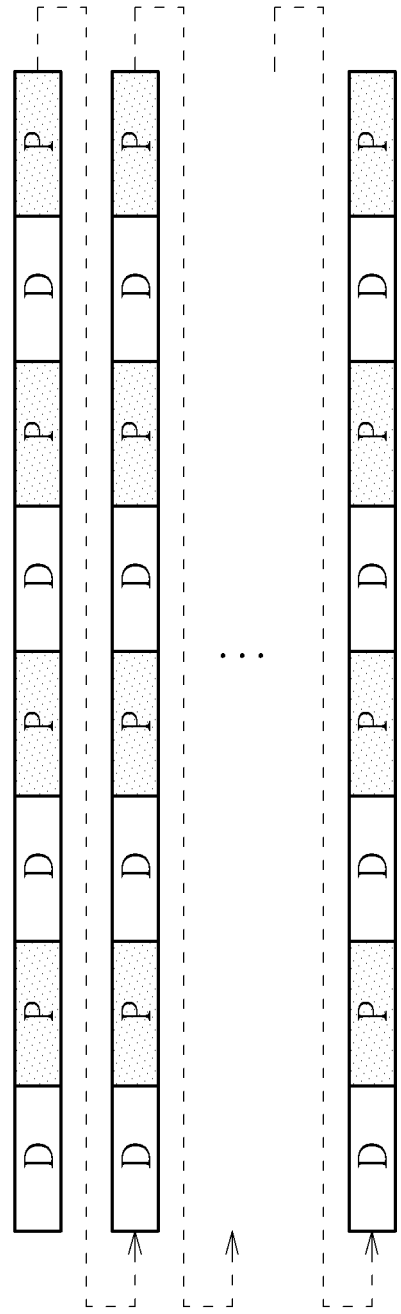
FIG. 3 illustrates a first table protection control scheme according to an embodiment of the present invention.

FIG. 3 illustrates a first table protection control scheme according to an embodiment of the present invention. When updating a first table among the aforementioned at least one table, the memory controller 110 may write multiple pages in the aforementioned at least one table block to generate a writing sequence such as that shown in FIG. 3, starting from the upper left in a row by row manner as illustrated with the arrows depicted by dashed lines, and more particularly, write an updated table content of the first table into a new table page, and may further write a RAID parity code (which may be referred to as the RAID parity for brevity) of the updated table content into a parity page, for protecting the updated table content with the RAID parity, in order to generate a table RAID protection group having two pages, for protecting the updated table content with the RAID parity stored in the parity page (i.e., the last page of the two pages). For example, the RAID parity stored in the parity page may be equal to the updated table content stored in the new table page, but the present invention is not limited thereto. As a result, the memory controller 110 may write the updated table contents into multiple new table pages of the aforementioned at least one table block and write the RAID parities of the updated table contents stored in the multiple new table pages into corresponding parity pages, respectively, in order to generate multiple table RAID protection groups for protecting the updated table contents, respectively, where the ratio of the parity page count to the total page count in one table RAID protection group of this embodiment is equal to (½).

Figure 4:
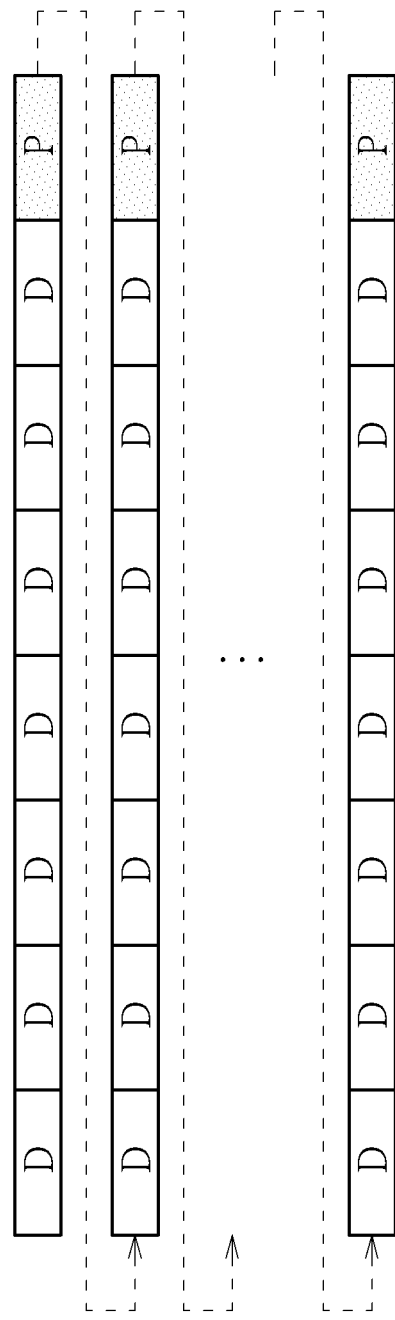
FIG. 4 illustrates a second table protection control scheme according to an embodiment of the present invention.

FIG. 4 illustrates a second table protection control scheme according to an embodiment of the present invention. During updating the first table, the memory controller 110 may write multiple pages in the aforementioned at least one table block to generate a writing sequence such as that shown in FIG. 4, starting from the upper left in a row by row manner as illustrated with the arrows depicted by dashed lines, and more particularly, write the updated table contents into seven new table pages of the aforementioned at least one table block, respectively, and write the RAID parity of the updated table contents stored the seven new table pages into a corresponding parity page immediately coming after the seven new table pages, in order to generate a table RAID protection group having eight pages, for protecting the updated table contents with the RAID parity stored in the corresponding parity page (i.e., the last page of the eight pages). For example, the memory controller 110 may utilize the RAID circuit 115 to perform RAID encoding on the updated table contents corresponding to the seven new table pages to generate the RAID parity. In comparison with the embodiment shown in FIG. 3, the ratio of the parity page count to the total page count in one table RAID protection group is equal to (⅛) in this embodiment.

For better comprehension, regarding whether to start protecting the new table page(s), the table page(s) that have not been protected with any parity page may be referred to as non-protected table page(s). When a non-protected table page count of the non-protected table page(s) reaches a predetermined non-protected table page count threshold M1, the memory controller 110 may write the RAID parity of the updated table content(s) stored in the new table page(s) into a corresponding parity page immediately coming after the new table page(s), in order to generate a table RAID protection group having M pages, for protecting the updated table content(s) with the RAID parity stored in the corresponding parity page (i.e., the last page of the M pages), where M1=(M−1), and "M" may be a positive integer that is greater than one. For example, the memory controller 110 may operate according to the first table protection control scheme shown in FIG. 3, and set the predetermined non-protected table page count threshold M1 as a first fixed value. In a situation where M=2, M1=(2−1)=1. For another example, the memory controller 110 may operate according to the second table protection control scheme shown in FIG. 4, and set the predetermined non-protected table page count threshold M1 as a second fixed value. In a situation where M=8, M1=(8−1)=7.

Figure 5:
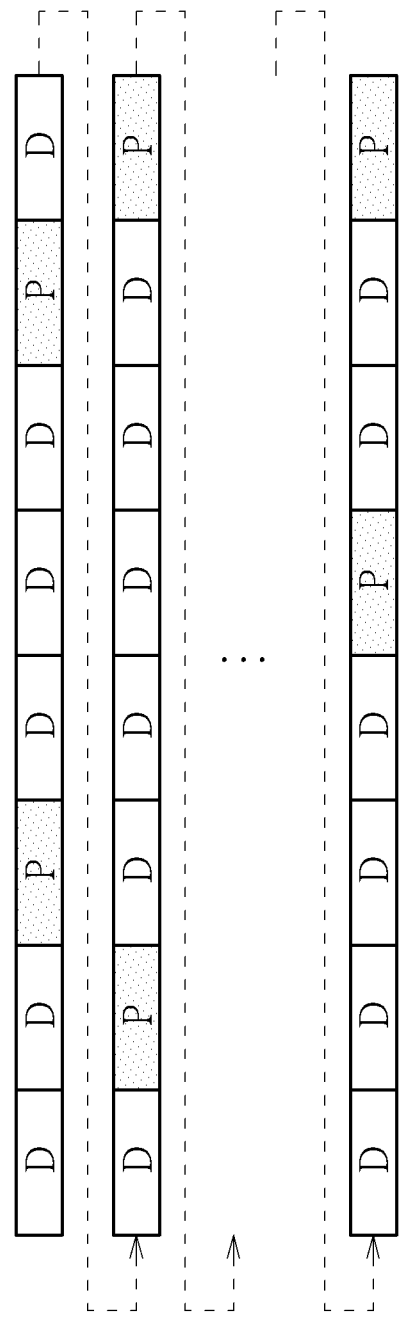
FIG. 5 illustrates a variable-page-group table protection control scheme of a method for performing table management of a memory device in a predetermined communications architecture with aid of system-region GC according to an embodiment of the present invention.

FIG. 5 illustrates a variable-page-group table protection control scheme of a method for performing table management of a memory device such as the memory device 100 shown in FIG. 1 in a predetermined communications architecture with aid of system-region GC according to an embodiment of the present invention. In comparison with the embodiments respectively shown in FIG. 3 and FIG. 4, the ratio (1/M) of the parity page count to the total page count in one table RAID protection group is variable or changeable as a result of operating according to the variable-page-group table protection control scheme in this embodiment, where the ratio (1/M) may be referred to as the parity ratio (1/M). During updating the first table, the memory controller 110 may write multiple pages in the aforementioned at least one table block to generate a writing sequence such as that shown in FIG. 5, starting from the upper left in a row by row manner as illustrated with the arrows depicted by dashed lines, and more particularly, write one or more table pages and then write a parity page when there is a need, to generate a table RAID protection group having M pages.

As the memory controller 110 operating according to the variable-page-group table protection control scheme may write the parity page immediately to protect the one or more table pages, rather than waiting for the non-protected table page count of the non-protected table page(s) reaching any fixed value, the parity ratio (1/M) will not remain constant. For example, the memory controller 110 may utilize the RAID circuit 115 to perform RAID encoding on the updated table contents corresponding to (M−1) new table pages to generate the RAID parity. As a result, the parity ratio (1/M) may vary from one table RAID protection group to another table RAID protection group.

According to some embodiments, the plurality of NV memory elements 122-1, 122-2, . . . , and 122-N may comprise at least two memory elements 122-1 and 122-2 such as the chips #0 and #1 or the dies #0 and #1, and the aforementioned any NV memory element 122-*n* within the NV memory elements 122-1, 122-2, . . . , and 122-N may comprise multiple planes such as the planes #0 and #1, where any plane among the multiple planes of the NV memory element 122-*n* may comprise its own blocks #0, #1, etc. In addition, the memory controller 110 may combine multiple sets of corresponding blocks #0, #1, etc. in all planes of all NV memory elements into multiple superblocks #0, #1, etc., respectively. The memory controller 110 may access (e.g., read or write) the multiple sets of corresponding blocks #0, #1, etc. within the multiple superblocks #0, #1, etc. according to multiple physical block addresses (PBAs), respectively, and more particularly, access the corresponding pages within the multiple superblocks #0, #1, etc. according to the multiple PBAs and the associated physical page addresses (PPAs), respectively. For example, in any of the embodiments shown in FIGS. 3-5, a same row of pages may represent a set of corresponding pages accessed with the same PBA and the same PPA, but the present invention is not limited thereto. For brevity, similar descriptions for these embodiments are not repeated in detail here.

Figure 6:
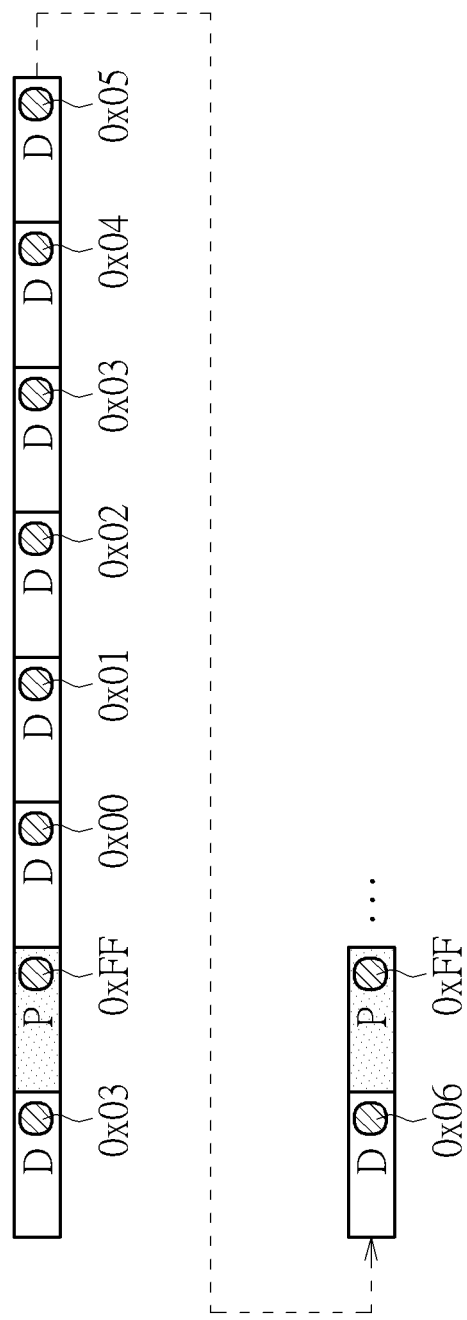
FIG. 6 illustrates some implementation details of the variable-page-group table protection control scheme shown in FIG. 5 according to an embodiment of the present invention.

FIG. 6 illustrates some implementation details of the variable-page-group table protection control scheme shown in FIG. 5 according to an embodiment of the present invention. During updating the first table, the memory controller 110 may store metadata such as a RAID index, a parity identifier, etc. in the pages (e.g., the table pages and the parity pages) of the aforementioned at least one table block, for identifying the pages in subsequent processing, respectively. For example, the memory controller 110 may set the RAID indexes of four table pages of a previous table RAID protection group to be {0x00, 0x01, 0x02, 0x03}, respectively, and set the parity identifier of the parity page of the previous table RAID protection group to be 0xFF; the memory controller 110 may set the RAID indexes of seven table pages of a current table RAID protection group to be {0x00, 0x01, 0x02, 0x03, 0x04, 0x05, 0x06}, respectively, and set the parity identifier of the parity page of the current table RAID protection group to be 0xFF; and the rest may be deduced by analogy.

Figure 7:
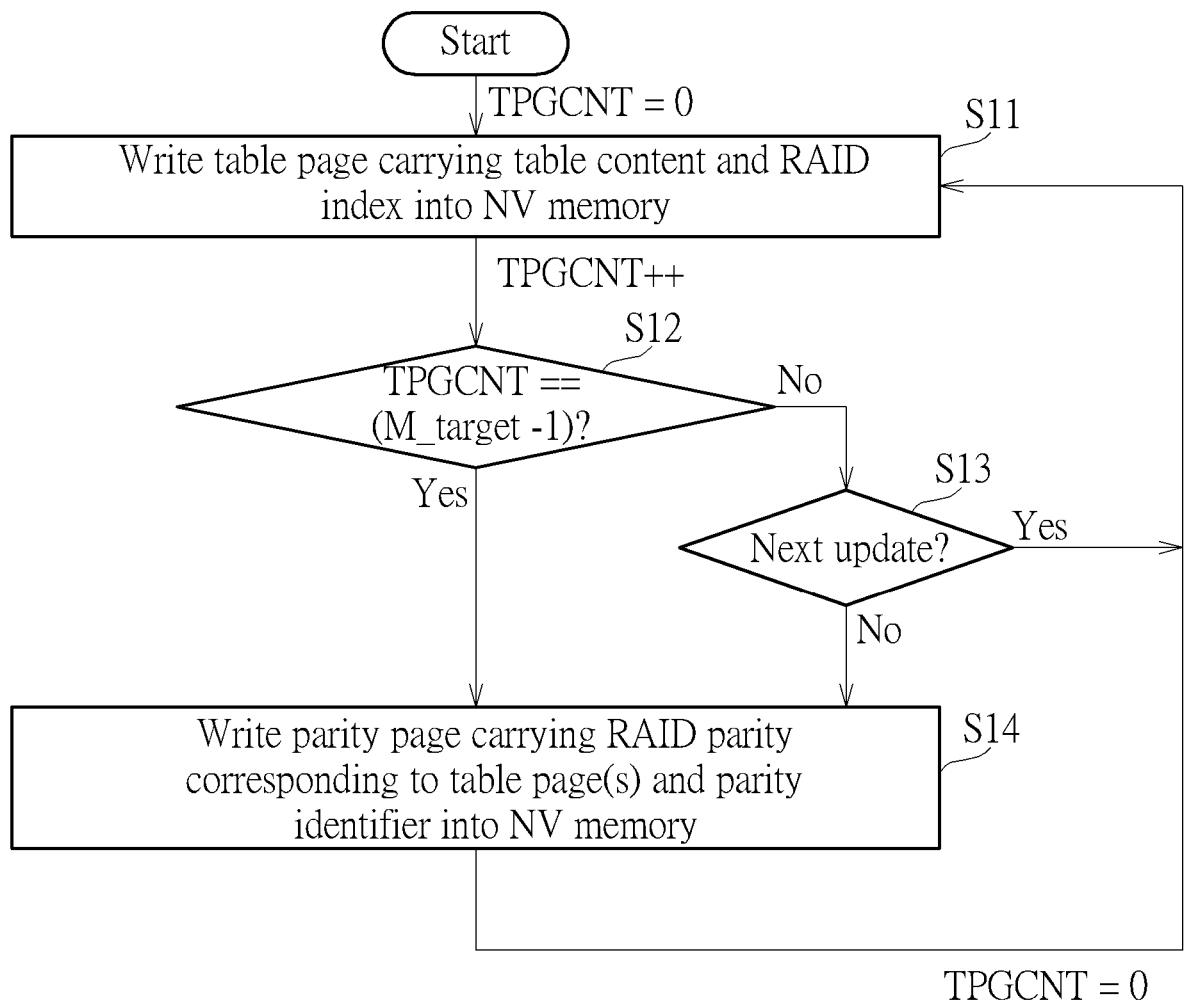
FIG. 7 illustrates a dynamic table protection control scheme of the method according to an embodiment of the present invention.

FIG. 7 illustrates a dynamic table protection control scheme of the method according to an embodiment of the present invention. For example, the memory controller 110 may set an initial value of a table page count TPGCNT to be zero before executing Step S11, increase the table page count TPGCNT with an increment of one (labeled "TPGCNT++" for brevity) after executing Step S11, and reset the table page count TPGCNT to be zero after executing Step S14, where the table page count TPGCNT may be arranged to indicate the non-protected table page count. In addition, the memory controller 110 may operate according to a parameter M_target, in order to limit the respective page counts {M} of all table RAID protection groups to be less than or equal to the parameter M_target, and the parameter M_target may be equal to a predetermined value such as a fixed value.

In Step S11, the memory controller 110 may write a table page carrying a RAID index into the NV memory 120 to be a new table page, and more particularly, write or store a latest table content such as an updated table content and the RAID index in the new table page, where the RAID index may be equal to TPGCNT of this moment (i.e., the current value of the table page count TPGCNT when Step S11 is executed). The new table pages in the table RAID protection groups of the variable-page-group table protection control scheme as shown in FIG. 5 and FIG. 6 can be taken as examples of the new table page mentioned in Step S11.

In Step S12, the memory controller 110 may check whether the table page count TPGCNT reaches the difference (M_target−1) between the parameter M_target and one (labeled "TPGCNT==(M_target−1)" for brevity). If Yes, Step S14 is entered; if No, Step S13 is entered.

In Step S13, the memory controller 110 may check whether a next update of the table is needed at this moment (i.e., the time point at which Step S13 is executed). If Yes, Step S11 is entered; if No, Step S14 is entered.

In Step S14, the memory controller 110 may write a parity page carrying a RAID parity corresponding to the non-protected table page(s) and the parity identifier into the NV memory 120 to be a new parity page, and more particularly, write or store the RAID parity and the parity identifier in the new parity page. For example, the memory controller 110 may utilize the RAID circuit 115 to perform RAID encoding on the table contents of the non-protected table page(s) to generate the RAID parity, but the present invention is not limited thereto. For another example, when TPGCNT=1 at this moment (i.e., the time point at which Step S14 is executed), which means the non-protected table page(s) comprise a single non-protected table page, the memory controller 110 may use the table content of the single non-protected table page to be the RAID parity of this table content, for being stored in the new parity page.

For better comprehension, the method may be illustrated with the working flow shown in FIG. 7, but the present invention is not limited thereto. According to some embodiments, one or more steps may be added, deleted, or changed in the working flow shown in FIG. 7.

According to some embodiments, the memory controller 110 may utilize the RAID circuit 115 to perform at least one bitwise exclusive-OR (XOR) operation on the table contents to generate at least one XOR result to be the RAID parity according to the table contents. For example, the memory controller 110 may use a first table content of a first non-protected table page to be a first RAID parity of the first table content, utilize the RAID circuit 115 to perform a first XOR operation on a second table contents of a second non-protected table page and the first RAID parity to generate a second RAID parity of the second table contents, utilize the RAID circuit 115 to perform a second XOR operation on a third table contents of a third non-protected table page and the second RAID parity to generate a third RAID parity of the third table contents, and the rest may be deduced by analogy. For brevity, similar descriptions for these embodiments are not repeated in detail here.

Figure 8:
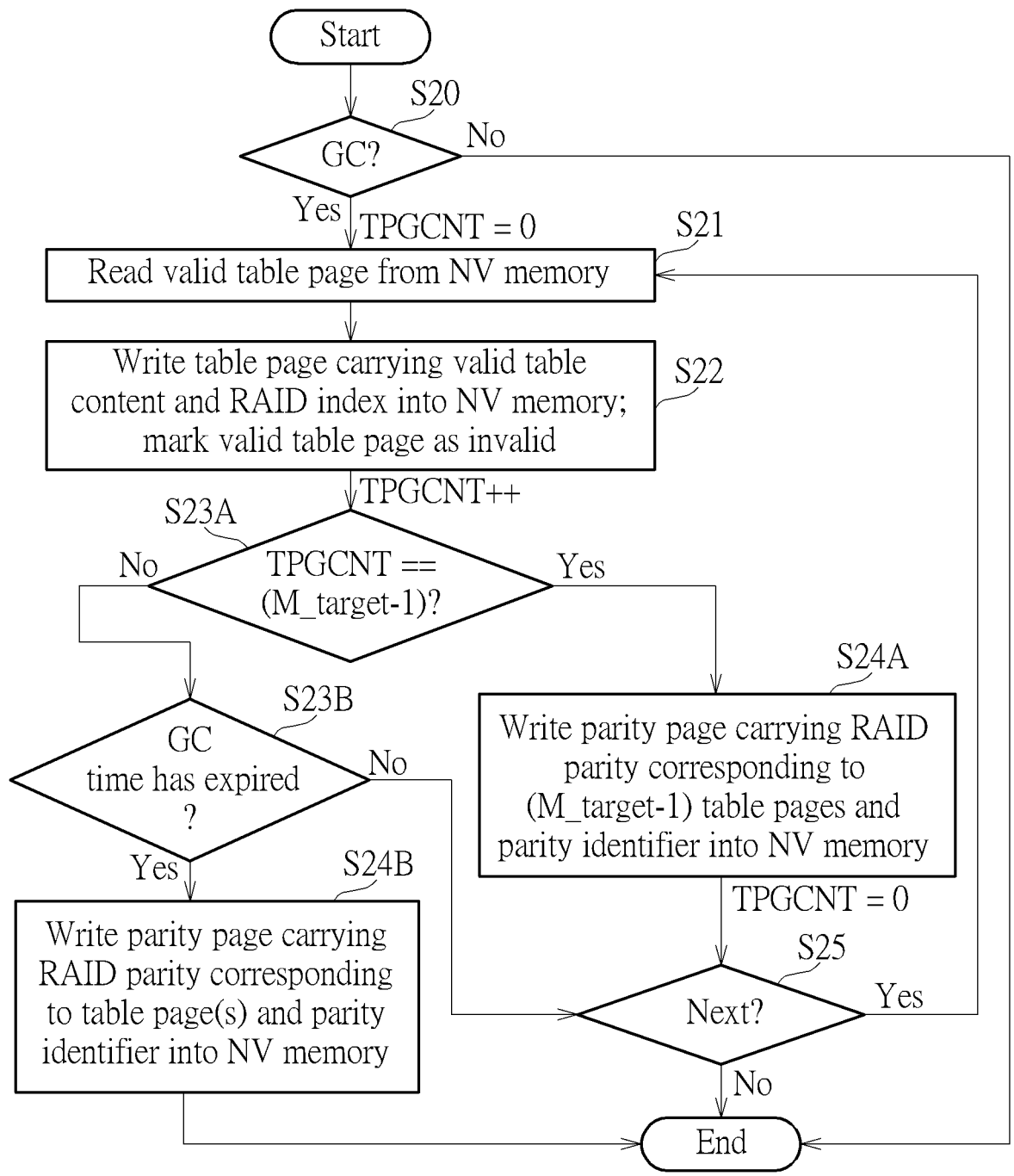
FIG. 8 illustrates a system-region GC control scheme of the method according to an embodiment of the present invention.

FIG. 8 illustrates a system-region GC control scheme of the method according to an embodiment of the present invention. For example, after some table contents of the aforementioned at least one table become invalid due to table update operations, the memory controller 110 may perform a system-region GC procedure on the system region, and more particularly, discard multiple invalid table pages comprising invalid table contents, obtain multiple valid table pages comprising valid table contents from the existing table RAID protection groups (e.g., the table RAID protection groups of the variable-page-group table protection control scheme as shown in FIG. 5 and FIG. 6), and store the valid table contents of the multiple valid table pages into destination pages to be new table pages and write new RAID parities into new parity pages correspondingly to generate a plurality of new table RAID protection groups. As a result of performing the system-region GC procedure one or more times, an average of the associated parity ratios (1/M) may decrease to automatically approach and eventually reach a target parity ratio (1/M_target). For example, the destination pages and the new parity pages may be arranged as shown in FIG. 4, and the target parity ratio (1/M_target) may be equal to (⅛) when M_target=8, but the present invention is not limited thereto. According to some embodiments, the parameter M_target may be equal to any of some other positive integers greater than two, and the target parity ratio (1/M_target) may vary correspondingly. In addition, the memory controller 110 may set the initial value of the table page count TPGCNT to be zero before executing Step S21, increase the table page count TPGCNT with the increment of one (labeled "TPGCNT++" for brevity) after executing Step S22, and reset the table page count TPGCNT to be zero after executing Step S24, where the table page count TPGCNT may be arranged to indicate the non-protected table page count.

In Step S20, the memory controller 110 may determine whether any GC of the system region should be performed. If Yes, Step S21 is entered to start performing the GC; if No, the working flow shown in FIG. 8 comes to the end. More particularly, according to a spare block count of a spare region within the NV memory 120, such as the number of spare blocks in the spare region, the memory controller 110 may determine whether to execute a partial working flow starting from Step S21. During updating the aforementioned at least one table, the memory controller 110 may use at least one spare block in the spare region to be at least one new table block, for storing newly updated table contents. As the aforementioned at least one spare block may become the aforementioned at least one new table block to be at least one new member among the aforementioned at least one table block, the spare block count may decrease correspondingly. For example, when the spare block count is less than a predetermined spare block count, which may indicate that the remaining spare block(s) are insufficient, the memory controller 110 may determine that the GC of the system region should be performed to release more storage space, and therefore Step S21 is entered. After the GC is completed, the spare block count may increase to become greater than the predetermined spare block count again. For another example, when the spare block count is greater than or equal to the predetermined spare block count, which may indicate that the remaining spare block(s) are sufficient, the memory controller 110 may determine that the GC of the system region should not be performed.

In Step S21, the memory controller 110 may read a valid table page among a plurality of table pages of the existing table RAID protection groups from the NV memory 120, and more particularly, read a valid table content of the valid table page from the NV memory 120, where the valid table page is one of the multiple valid table pages, and the valid table content is one of the valid table contents mentioned above. The new table pages in the table RAID protection groups of the variable-page-group table protection control scheme as shown in FIG. 5 and FIG. 6 can be taken as examples of the plurality of table pages mentioned in Step S21. As the metadata such as the RAID index, the parity identifier, etc. may have been stored in the pages of the existing table RAID protection groups, the memory controller 110 may identify the table pages and the parity pages in the existing table RAID protection groups, to obtain the valid table page from the plurality of table pages.

In Step S22, the memory controller 110 may write a table page carrying the valid table content of the valid table page and a new corresponding RAID index into the NV memory 120 to be a new table page among the destination pages mentioned above, and more particularly, write or store the valid table content and the new corresponding RAID index in the new table page, and mark the valid table page as invalid, where the corresponding RAID index may be equal to TPGCNT of this moment (i.e., the current value of the table page count TPGCNT when Step S22 is executed). For example, the destination pages may be arranged as shown in FIG. 4, and the target parity ratio (1/M_target) may be equal to (⅛).

In Step S23A, the memory controller 110 may determine whether the table page count TPGCNT reaches the difference (M_target−1) between the parameter M_target and one (labeled "TPGCNT==(M_target−1)" for brevity). If Yes, which may indicate that there are (M_target−1) non-protected table pages at this moment (i.e., the time point when Step S23A is executed), Step S24A is entered; if No, Step S23B is entered.

In Step S23B, the memory controller 110 may determine whether a predetermined GC time has expired. If Yes, Step S24B is entered; if No, Step S25 is entered. For example, the memory controller 110 may perform the system-region GC procedure in the background with a time limitation of the predetermined GC time for each time, to prevent delaying the foreground operations (e.g., the operations of accessing data in the NV memory 120 for the host device 50).

In Step S24A, the memory controller 110 may write a parity page carrying a RAID parity corresponding to the (M_target−1) non-protected table pages and the parity identifier into the NV memory 120 to be a new parity page, and more particularly, write or store the RAID parity and the parity identifier in the new parity page. For example, the memory controller 110 may utilize the RAID circuit 115 to perform RAID encoding on the table contents of the (M_target−1) non-protected table pages to generate the RAID parity.

In Step S24B, the memory controller 110 may write a parity page carrying a RAID parity corresponding to the non-protected table page(s) and the parity identifier into the NV memory 120 to be a new parity page, and more particularly, write or store the RAID parity and the parity identifier in the new parity page. For example, the memory controller 110 may utilize the RAID circuit 115 to perform RAID encoding on the table contents of the non-protected table page(s) to generate the RAID parity, but the present invention is not limited thereto. For another example, when TPGCNT=1 at this moment (i.e., the time point at which Step S24B is executed), which means the non-protected table page(s) comprise a single non-protected table page, the memory controller 110 may use the table content of the single non-protected table page to be the RAID parity of this table content, for being stored in the new parity page.

In Step S25, the memory controller 110 may check whether a next system-region-GC operation is needed at this moment (i.e., the time point at which Step S25 is executed). If Yes, Step S21 is entered; if No, the working flow shown in FIG. 8 comes to the end. For example, the memory controller 110 may determine whether all of the valid table contents of the multiple valid table pages have been written into the destination pages. If all of the valid table contents of the multiple valid table pages have been written into the destination pages, the memory controller 110 may determine that no more system-region-GC operation is needed at this moment; otherwise, the memory controller 110 may determine that next system-region-GC operation is needed at this moment.

For better comprehension, the method may be illustrated with the working flow shown in FIG. 8, but the present invention is not limited thereto. According to some embodiments, one or more steps may be added, deleted, or changed in the working flow shown in FIG. 8. For example, after obtaining the determination result "No" of Step S25, the memory controller 110 may selectively perform an erase procedure to release more storage space. More particularly, the memory controller 110 may determine whether to perform the erase procedure according to whether there is no foreground operation. If there is no foreground operation, the memory controller 110 may perform the erase procedure to erase one or more invalid table blocks, such as the table blocks having no valid table pages; otherwise, the memory controller 110 may prevent performing the erase procedure. For brevity, similar descriptions for these embodiments are not repeated in detail here.

According to some embodiments, the spare region may be divided into a first spare region and a second spare region, and the memory controller 110 may use at least one first spare block in the first spare region to be the aforementioned at least one new table block, and use at least one second spare block in the second spare region to be at least one data block for storing user data, but the present invention is not limited thereto.

Figure 9:
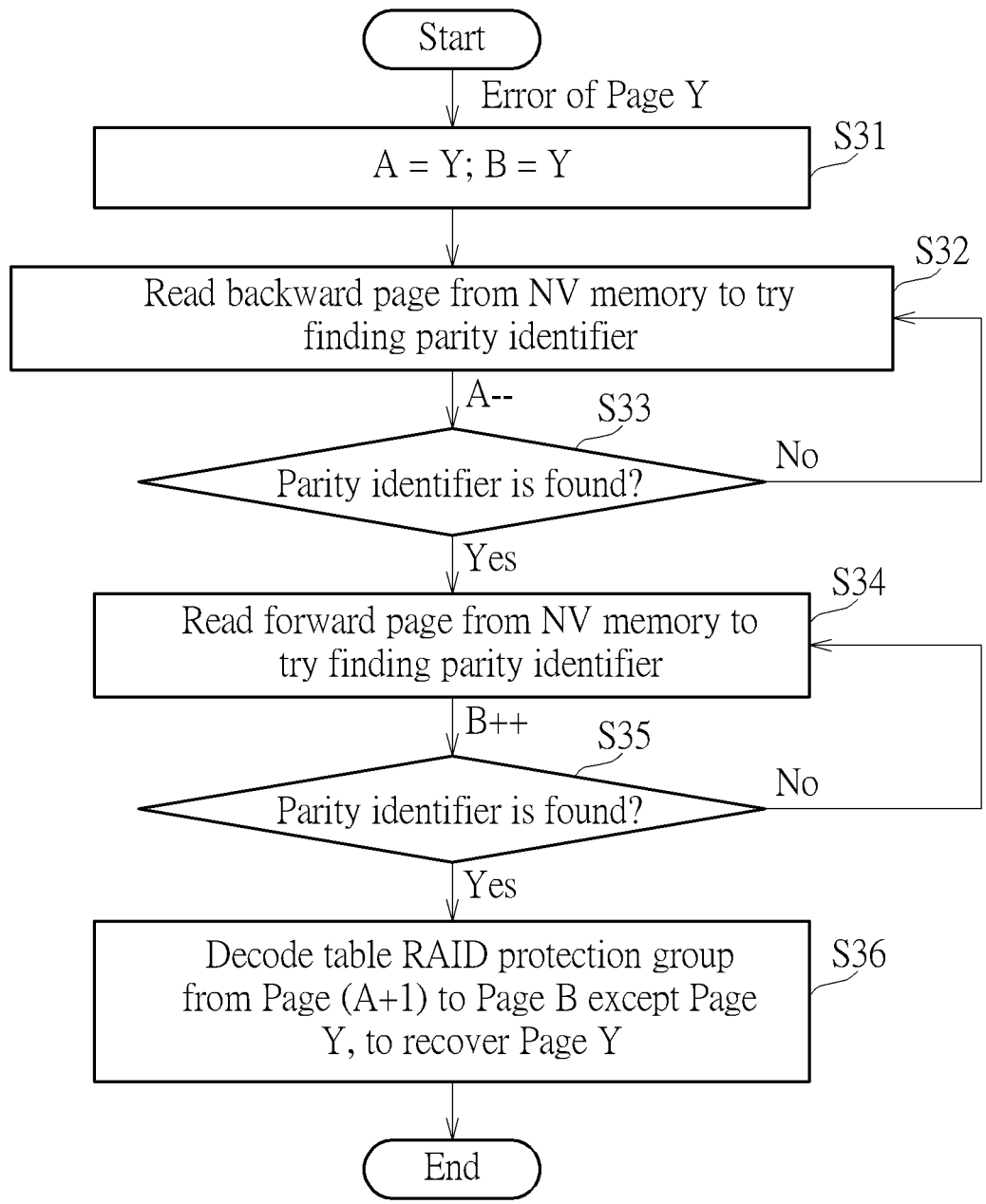
FIG. 9 illustrates an error correction control scheme of the method according to an embodiment of the present invention.

FIG. 9 illustrates an error correction control scheme of the method according to an embodiment of the present invention. When any error of any table page of an existing table RAID protection group among the existing table RAID protection groups occurs, the memory controller 110 may determine the beginning location and the end location of this existing table RAID protection group, such as the location of the first table page of the existing table RAID protection group and the location of the parity page of the existing table RAID protection group, and correct the error to recover the table page. The table page having the error may be referred to as the erroneous table page. For example, the erroneous table page may be Page Y, where "Y" may be an integer for indicating the location of the erroneous table page along the writing sequence of the pages in the aforementioned at least one table block. The memory controller 110 may change the location parameters A and B, and more particularly, decrease the location parameter A with a decrement of one after executing Step S32 (labeled "A--" for brevity), and increase the location parameter B with an increment of one after executing Step S34 (labeled "B++" for brevity). After executing the loop comprising Steps S32 and S33 one or more times, the memory controller 110 may use the resultant value of the location parameter A plus one (i.e., (A+1)) to indicate the location of the first table page of the existing table RAID protection group along the writing sequence. After executing the loop comprising Steps S34 and S35 one or more times, the memory controller 110 may use the resultant value of the location parameter B to indicate the location of the parity page of the existing table RAID protection group along the writing sequence.

In Step S31, the memory controller 110 may set the initial values of the location parameters A and B to be the same as Y, where "A" and "B" may be integers.

In Step S32, the memory controller 110 may read a backward page from the NV memory 120 to try finding the parity identifier (e.g., 0xFF). At this moment (e.g., a time point at which Step S32 is executed), the backward page may represent Page (A-1).

In Step S33, the memory controller 110 may check whether the parity identifier is found. If Yes, Step S34 is entered; if No, Step S32 is entered.

In Step S34, the memory controller 110 may read a forward page from the NV memory 120 to try finding the parity identifier (e.g., 0xFF). At this moment (e.g., a time point at which Step S34 is executed), the forward page may represent Page (B+1).

In Step S35, the memory controller 110 may check whether the parity identifier is found. If Yes, Step S36 is entered; if No, Step S34 is entered.

In Step S36, the memory controller 110 may decode the existing table RAID protection group from Page (A+1) to Page B except Page Y, to recover Page Y.

For better comprehension, the method may be illustrated with the working flow shown in FIG. 9, but the present invention is not limited thereto. According to some embodiments, one or more steps may be added, deleted, or changed in the working flow shown in FIG. 9.

According to some embodiments, the first table may represent at least one portion (e.g., a portion or all) of the global L2P address mapping table 120, such as the first local L2P address mapping table within the global L2P address mapping table 120T, but the present invention is not limited thereto. According to some embodiments, the first table may represent the P2L address mapping table 227T. According to some embodiments, the first table may represent a valid page count table, and the memory controller 110 may record the valid page counts (e.g., the numbers of valid pages) of the aforementioned at least one portion of the plurality of blocks into the valid page count table, respectively. For example, the memory controller 110 may configure a plurality of data blocks among the plurality of blocks to be in a data region for storing user data, system data, etc. within the NV memory 120, and record the respective valid page counts of the plurality of data blocks into the valid page count table. For brevity, similar descriptions for these embodiments are not repeated in detail here.

Figure 10:
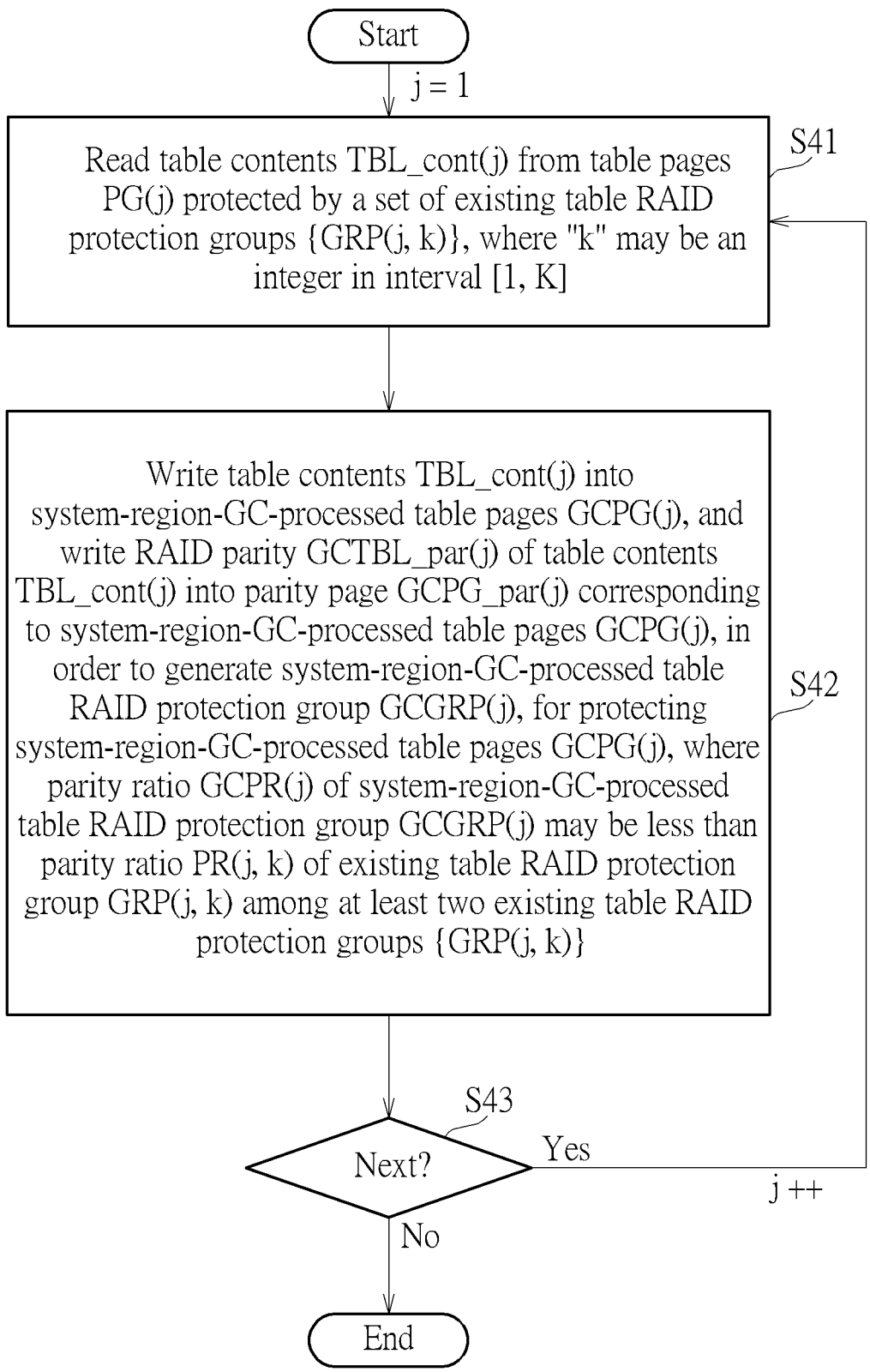
FIG. 10 illustrates a working flow of the method according to an embodiment of the present invention.

FIG. 10 illustrates a working flow of the method according to an embodiment of the present invention. The memory controller 110 may operate according to the variable-page-group table protection control scheme shown in FIG. 5 to perform the table management procedure to make the aforementioned at least one table be stored with RAID protection in the aforementioned at least one table block, and more particularly, generate the existing table RAID protection groups in the aforementioned at least one table block, and may further operate according to the system-region GC control scheme to perform the system-region GC procedure on the existing table RAID protection groups, in order to decrease an average parity ratio of the aforementioned at least one table block, such as the average of the parity ratios (1/M), to make the average of the parity ratios (1/M) approach or reach the target parity ratio (1/M_target).

In order to clearly illustrate a preferred processing result regarding the system-region GC control scheme shown in FIG. 8, assume that:

(1) in Step S20, the memory controller 110 may determine that the GC of the system region should be performed, and the partial working flow corresponding to the determination result "Yes" of Step S20 may be executed; and (2) in Step S23B, the memory controller 110 may determine that the predetermined GC time has not expired, and the partial working flow corresponding to the determination result "No" of Step S23B may be executed;

but the present invention is not limited thereto. For example, when updating the first table in the table management procedure, the memory controller 110 may update multiple previous table contents {TBL_cont_prev(i)} (e.g., the previous table contents {TBL_cont_prev(1), TBL_cont_prev(2), . . . }) of the first table to generate multiple updated table contents {TBL_cont_u(i)} (e.g., the updated table contents {TBL_cont_u(1), TBL_cont_u(2), . . . }) of the first table, where "i" may have an initial value such as one, and may increase with an increment such as one. In addition, when performing system-region GC in the system-region GC procedure, the memory controller 110 may select multiple sets of table contents {TBL_cont(j)} (e.g., the sets of table contents {TBL_cont(1), TBL_cont(2), . . . }) from the multiple updated table contents {TBL_cont_u(i)}, in order to store the multiple sets of table contents {TBL_cont(j)} in multiple system-region-GC-processed table RAID protection groups {GCGRP(j)} (e.g., the system-region-GC-processed table RAID protection groups {GCGRP(1), GCGRP(2), . . . }), where "j" may have an initial value such as one (labeled "j=1" for brevity), and may increase with an increment such as one (labeled "j++" for brevity).

In Step S41, the memory controller 110 may select a set of table contents TBL_cont(j) from at least one portion (e.g., a portion or all) of the multiple updated table contents {TBL_cont_u(i)}, and more particularly, read the set of table contents TBL_cont(j) from a set of table pages PG(j) protected by a set of existing table RAID protection groups {GRP(j, k)} among the existing table RAID protection groups mentioned above, where "k" may be an integer in the interval [1, K], and "K" may be a positive integer. For example, when K>1, the set of existing table RAID protection groups {GRP(j, k)} may comprise multiple existing table RAID protection groups {GRP(j, k)} such as the existing table RAID protection groups {GRP(j, 1), . . . , GRP(j, K)}. For another example, when K=1, the set of existing table RAID protection groups {GRP(j, k)} may comprise a single existing table RAID protection group GRP(j, k) such as the existing table RAID protection groups GRP(j, 1).

As the multiple updated table contents {TBL_cont_u(i)} may be protected by the existing table RAID protection groups mentioned above, such as the table RAID protection groups of the variable-page-group table protection control scheme as shown in FIG. 5 and FIG. 6, any existing table RAID protection group GRP(j, k) among the set of existing table RAID protection groups {GRP(j, k)} may comprise at least one table page and a parity page. More particularly, when K>1, at least two existing table RAID protection groups {GRP(j, k)} among the set of existing table RAID protection groups {GRP(j, k)} may correspond to different parity ratios {PR(j, k)}. For example, the set of existing table RAID protection groups {GRP(j, k)} may comprise the existing table RAID protection groups {GRP(j, 1), GRP(j, 2), . . . }, and the parity ratio PR(j, 1) of the existing table RAID protection group GRP(j, 1) and the parity ratio PR(j, 2) of the existing table RAID protection group GRP(j, 2) may be different from each other.

In Step S42, the memory controller 110 may write the set of table contents TBL_cont(j) into a set of system-region-GC-processed table pages GCPG(j) of the aforementioned at least one table block, and write a RAID parity GCTBL_par(j) of the set of table contents TBL_cont(j) into a parity page GCPG_par(j) corresponding to the set of system-region-GC-processed table pages GCPG(j) in the aforementioned at least one table block, in order to generate a system-region-GC-processed table RAID protection group GCGRP(j), for protecting the set of system-region-GC-processed table pages GCPG(j), where a parity ratio GCPR(j) of the system-region-GC-processed table RAID protection group GCGRP(j) may be less than a parity ratio PR(j, k) of an existing table RAID protection group GRP(j, k) among the aforementioned at least two existing table RAID protection groups {GRP(j, k)}. For example, the parity ratio GCPR(j) may be less than or equal to a parity ratio PR(j, k) of another existing table RAID protection group GRP(j, k) among the aforementioned at least two existing table RAID protection groups {GRP(j, k)}.

In Step S43, the memory controller 110 may check whether a next system-region-GC operation is needed at this moment (i.e., the time point at which Step S43 is executed). If Yes, Step S41 is entered; if No, the working flow shown in FIG. 10 comes to the end.

According to this embodiment, the memory controller 110 may perform the system-region GC procedure on the system region, to allow the parity ratio GCPR(j) to be equal to the target parity ratio (1/M_target) of the system-region GC procedure. As a result, the average parity ratio such as the average of the parity ratios (1/M) may decrease to automatically approach and eventually reach the target parity ratio (1/M_target). In addition, the memory controller 110 may select the multiple sets of table contents {TBL_cont(j)} from the multiple updated table contents {TBL_cont_u(i)} in the writing order of the multiple updated table contents {TBL_cont_u(i)} along a writing sequence of the pages in the aforementioned at least one table block, but the present invention is not limited thereto. According to some embodiments, the memory controller 110 may select the multiple sets of table contents {TBL_cont(j)} from the multiple updated table contents {TBL_cont_u(i)} arbitrarily. According to some embodiments, the memory controller 110 may select one or more sets of table contents among the multiple sets of table contents {TBL_cont(j)} from the multiple updated table contents {TBL_cont_u(i)} in the writing order of the multiple updated table contents {TBL_cont_u(i)} along the writing sequence, and select one or more sets of other table contents among the multiple sets of table contents {TBL_cont(j)} from the multiple updated table contents {TBL_cont_u(i)} arbitrarily.

For better comprehension, the method may be illustrated with the working flow shown in FIG. 10, but the present invention is not limited thereto. According to some embodiments, one or more steps may be added, deleted, or changed in the working flow shown in FIG. 10. For example, the operation of reading the set of table contents TBL_cont(j) from the set of table pages PG(j) in Step S41 may comprise the operation of reading the valid table page as mentioned in Step S21, the operation of writing the set of table contents TBL_cont(j) into the set of system-region-GC-processed table pages GCPG(j) in Step S42 may comprise the operation of writing the table page carrying the valid table content of the valid table page and the new corresponding RAID index to be the new table page as mentioned in Step S22, and the operation of writing the RAID parity GCTBL_par(j) into the parity page GCPG_par(j) in Step S42 may comprise the operation of writing the parity page carrying the RAID parity corresponding to the (M_target−1) non-protected table pages and the parity identifier into the NV memory 120 as mentioned in Step S24A. For brevity, similar descriptions for these embodiments are not repeated in detail here.

According to some embodiments, the aforementioned at least one address mapping table may comprise at least one L2P address mapping table (e.g., the global L2P address mapping table 120T) and at least one P2L address mapping table (e.g., the P2L address mapping table 227T). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing table management of a memory device in a predetermined communications architecture with aid of system-region garbage collection (GC), the method being applied to a memory controller of the memory device, the memory device comprising the memory controller and a non-volatile (NV) memory, the NV memory comprising at least one NV memory element, the at least one NV memory element comprising a plurality of blocks, the method comprising:
    utilizing the memory controller to perform a system-region GC procedure to manage at least one table regarding internal management of the memory device, wherein the at least one table is stored in at least one table block among the plurality of blocks and is stored with redundant array of independent disks (RAID) protection in the at least one table block, and the system-region GC procedure comprises:
        reading a set of first table contents from a set of first table pages protected by a set of first existing table RAID protection groups, wherein any existing table RAID protection group among the set of first existing table RAID protection groups comprises at least one table page and a parity page, and at least two first existing table RAID protection groups among the set of first existing table RAID protection groups correspond to different parity ratios; and
        writing the set of first table contents into a set of first system-region-GC-processed table pages of the at least one table block, and writing a first RAID parity of the set of first table contents into a first parity page corresponding to the set of first system-region-GC-processed table pages in the at least one table block, in order to generate a first system-region-GC-processed table RAID protection group, for protecting the set of first system-region-GC-processed table pages, wherein a first parity ratio of the first system-region-GC-processed table RAID protection group is less than a parity ratio of an existing table RAID protection group among the at least two first existing table RAID protection groups.

2. The method of claim 1, wherein the at least one table comprises at least one address mapping table, the memory controller is arranged to receive a set of first commands from a host device through a transmission interface circuit of the memory controller, and perform a table management procedure to update the at least one address mapping table correspondingly, wherein the set of first commands indicate that writing a set of first data is requested, respectively; and the memory controller is arranged to perform the table management procedure to make the at least one table be stored with the RAID protection in the at least one table block, and perform the system-region GC procedure to decrease an average parity ratio of the at least one table block.

3. The method of claim 2, wherein the at least one address mapping table comprises at least one logical-to-physical (L2P) address mapping table.

4. The method of claim 2, wherein the at least one address mapping table comprises at least one physical-to-logical (P2L) address mapping table.

5. The method of claim 2, wherein the at least one address mapping table comprises at least one logical-to-physical (L2P) address mapping table and at least one physical-to-logical (P2L) address mapping table.

6. The method of claim 1, wherein the first parity ratio is equal to a target parity ratio of the system-region GC procedure.

7. The method of claim 1, wherein the first parity ratio is less than or equal to a parity ratio of another existing table RAID protection group among the at least two first existing table RAID protection groups.

8. The method of claim 1, wherein the system-region GC procedure further comprises:
    reading a set of second table contents from a set of second table pages protected by a set of second existing table RAID protection groups, wherein any existing table RAID protection group among the set of second existing table RAID protection groups comprises at least one table page and a parity page, and at least two second existing table RAID protection groups among the set of second existing table RAID protection groups correspond to different parity ratios; and
    writing the set of second table contents into a set of second system-region-GC-processed table pages of the at least one table block, and writing a second RAID parity of the set of second table contents into a second parity page corresponding to the set of second system-region-GC-processed table pages in the at least one table block, in order to generate a second system-region-GC-processed table RAID protection group, for protecting the set of second system-region-GC-processed table pages, wherein a second parity ratio of the second system-region-GC-processed table RAID protection group is less than a parity ratio of an existing table RAID protection group among the at least two second existing table RAID protection groups.

9. The method of claim 8, wherein the first parity ratio and the second parity ratio are equal to a target parity ratio of the system-region GC procedure.

10. A memory controller of a memory device, the memory device comprising the memory controller and a non-volatile (NV) memory, the NV memory comprising at least one NV memory element, the at least one NV memory element comprising a plurality of blocks, the memory controller comprising:
    a processing circuit, arranged to control the memory controller according to a plurality of host commands from a host device, to allow the host device to access the NV memory through the memory controller, wherein the processing circuit is arranged to perform table management of the memory device in a predetermined communications architecture with aid of system-region garbage collection (GC);

wherein the memory controller performs a system-region GC procedure to manage at least one table regarding internal management of the memory device, wherein the at least one table is stored in at least one table block among the plurality of blocks and is stored with redundant array of independent disks (RAID) protection in the at least one table block, and the system-region GC procedure comprises:

reading a set of first table contents from a set of first table pages protected by a set of first existing table RAID protection groups, wherein any existing table RAID protection group among the set of first existing table RAID protection groups comprises at least one table page and a parity page, and at least two first existing table RAID protection groups among the set of first existing table RAID protection groups correspond to different parity ratios; and writing the set of first table contents into a set of first system-region-GC-processed table pages of the at least one table block, and writing a first RAID parity of the set of first table contents into a first parity page corresponding to the set of first system-region-GC-processed table pages in the at least one table block, in order to generate a first system-region-GC-processed table RAID protection group, for protecting the set of first system-region-GC-processed table pages, wherein a first parity ratio of the first system-region-GC-processed table RAID protection group is less than a parity ratio of an existing table RAID protection group among the at least two first existing table RAID protection groups.

11. The memory controller of claim 10, wherein the at least one table comprises at least one address mapping table; and the memory controller further comprises:

a transmission interface circuit, arranged to perform communications with the host device;

wherein the memory controller is arranged to receive a set of first commands from a host device through the transmission interface circuit of the memory controller, and perform a table management procedure to update the at least one address mapping table correspondingly, wherein the set of first commands indicate that writing a set of first data is requested, respectively; and the memory controller is arranged to perform the table management procedure to make the at least one table be stored with the RAID protection in the at least one table block, and perform the system-region GC procedure to decrease an average parity ratio of the at least one table block.

12. The memory device comprising the memory controller of claim 10, wherein the memory device comprises:

the NV memory, configured to store information; and the memory controller, coupled to the NV memory, configured to control operations of the memory device.

13. An electronic device comprising the memory device of claim 12, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *